(12) United States Patent
Datuashvili et al.

(10) Patent No.: US 12,500,949 B2
(45) Date of Patent: *Dec. 16, 2025

(54) ASYNCHRONOUS DISTRIBUTED DE-DUPLICATION FOR REPLICATED CONTENT ADDRESSABLE STORAGE CLUSTERS

(71) Applicant: Google LLC, Mountain View, CA (US)

(72) Inventors: Gia Datuashvili, Cupertino, CA (US); Alexander Kesselman, Sunnyvale, CA (US); Alexandre Drobychev, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,041

(22) Filed: Mar. 7, 2024

(65) Prior Publication Data

US 2024/0251012 A1   Jul. 25, 2024

Related U.S. Application Data

(63) Continuation of application No. 16/390,613, filed on Apr. 22, 2019, now Pat. No. 11,943,290, which is a
(Continued)

(51) Int. Cl.
*G06F 16/27* (2019.01)
*G06F 16/174* (2019.01)
(Continued)

(52) U.S. Cl.
CPC ...... *H04L 67/1095* (2013.01); *G06F 16/1748* (2019.01); *G06F 16/178* (2019.01);
(Continued)

(58) Field of Classification Search
CPC ......... H04L 6/1095; H04L 6/27; H04L 6/178; H04L 6/184; H04L 6/1748; H04L 6/2365;
(Continued)

(56) References Cited

U.S. PATENT DOCUMENTS 5,551,027 A   8/1996   Choy et al.
5,812,773 A   9/1998   Norin
(Continued)

FOREIGN PATENT DOCUMENTS

CN   1461438 A   12/2003
CN   1726446 A   1/2006
(Continued)

OTHER PUBLICATIONS

Google Inc., Notice of Allowance, CA 2747746, Nov. 27, 2014, 1 pg.
(Continued)

*Primary Examiner* — Apu M Mofiz
(74) *Attorney, Agent, or Firm* — Lerner David LLP

(57) ABSTRACT

A method is performed by a device of a group of devices in a distributed data replication system. The method includes storing an index of objects in the distributed data replication system, the index being replicated while the objects are stored locally by the plurality of devices in the distributed data replication system. The method also includes conducting a scan of at least a portion of the index and identifying a redundant replica(s) of the at least one of the objects based on the scan of the index. The method further includes de-duplicating the redundant replica(s), and updating the index to reflect the status of the redundant replica.

20 Claims, 11 Drawing Sheets

Related U.S. Application Data continuation of application No. 14/995,171, filed on Jan. 13, 2016, now Pat. No. 10,291,699, which is a continuation of application No. 14/265,298, filed on Apr. 29, 2014, now abandoned.

(51) Int. Cl.
  *G06F 16/178* (2019.01)
  *G06F 16/182* (2019.01)
  *G06F 16/23* (2019.01)
  *G06F 16/2455* (2019.01)
  *H04L 67/1095* (2022.01)

(52) U.S. Cl.
  CPC ........ *G06F 16/184* (2019.01); *G06F 16/2365* (2019.01); *G06F 16/24556* (2019.01); *G06F 16/27* (2019.01)

(58) Field of Classification Search
  CPC ... H04L 6/24556; G06F 16/27; G06F 16/178; G06F 16/184; G06F 16/1748; G06F 16/2365; G06F 16/24556
  USPC .......................................................... 707/754
  See application file for complete search history.

(56) References Cited

U.S. PATENT DOCUMENTS

| | | | |
|---|---|---|---|
| 5,897,664 A | 4/1999 | Nesheim et al. | |
| 6,192,365 B1 | 2/2001 | Draper et al. | |
| 6,438,562 B1 | 8/2002 | Gupta et al. | |
| 7,200,604 B2 | 4/2007 | Forman et al. | |
| 7,441,014 B1* | 10/2008 | Bulkowski | H04H 20/28 |
| | | | 348/E7.054 |
| 7,529,899 B2 | 5/2009 | Deguchi et al. | |
| 7,584,338 B1 | 9/2009 | Bricker et al. | |
| 7,647,329 B1* | 1/2010 | Fischman | G06F 3/067 |
| | | | 707/999.1 |
| 7,653,668 B1* | 1/2010 | Shelat | G06F 16/184 |
| | | | 707/610 |
| 7,669,023 B2 | 2/2010 | Murase | |
| 7,747,584 B1* | 6/2010 | Jernigan, IV | G06F 16/1748 |
| | | | 711/112 |
| 7,783,604 B1 | 8/2010 | Yueh | |
| 7,814,074 B2 | 10/2010 | Anglin et al. | |
| 7,814,149 B1 | 10/2010 | Stringham | |
| 7,814,499 B2 | 10/2010 | Straube et al. | |
| 7,822,939 B1 | 10/2010 | Veprinsky et al. | |
| 7,840,537 B2 | 11/2010 | Gokhale et al. | |
| 7,870,105 B2 | 1/2011 | Arakawa et al. | |
| 7,870,409 B2 | 1/2011 | Murase | |
| 7,873,809 B2 | 1/2011 | Kano | |
| 7,908,436 B1 | 3/2011 | Srinivasan et al. | |
| 7,921,077 B2 | 4/2011 | Ting et al. | |
| 7,930,306 B2 | 4/2011 | Scholtes et al. | |
| 7,949,622 B2 | 5/2011 | Sellamanickam et al. | |
| 7,962,706 B2 | 6/2011 | Davis | |
| 7,984,022 B2 | 7/2011 | Cannon et al. | |
| 7,984,026 B2 | 7/2011 | Iitsuka | |
| 7,996,371 B1 | 8/2011 | Deshmukh | |
| 8,108,353 B2 | 1/2012 | Balachandran et al. | |
| 8,135,918 B1 | 3/2012 | Yueh | |
| 8,190,835 B1 | 5/2012 | Yueh | |
| 8,204,866 B2 | 6/2012 | Chaudhuri et al. | |
| 8,346,730 B2 | 1/2013 | Srinivasan et al. | |
| 8,484,162 B2 | 7/2013 | Prahlad et al. | |
| 8,548,953 B2 | 10/2013 | Wong et al. | |
| 8,645,333 B2 | 2/2014 | Balachandran et al. | |
| 8,788,466 B2 | 7/2014 | Anglin et al. | |
| 8,793,226 B1 | 7/2014 | Yadav et al. | |
| 9,563,683 B2 | 2/2017 | Abercrombie et al. | |
| 9,747,322 B2 | 8/2017 | Drobychev et al. | |
| 9,817,865 B2 | 11/2017 | Chambliss et al. | |
| 9,928,248 B2 | 3/2018 | Akirav et al. | |
| 11,650,837 B2* | 5/2023 | Martin | H04L 41/5054 |
| | | | 709/226 |
| 11,853,263 B2* | 12/2023 | Shvachko | H04L 67/1095 |
| 11,960,452 B2* | 4/2024 | Memon | G06F 16/116 |
| 12,038,879 B2* | 7/2024 | Huang | G06F 16/1844 |
| 2002/0078174 A1* | 6/2002 | Sim | H04L 67/1095 |
| | | | 709/252 |
| 2004/0122958 A1 | 6/2004 | Wardrop | |
| 2004/0133606 A1* | 7/2004 | Miloushev | H04L 61/45 |
| 2004/0148397 A1 | 7/2004 | Aronoff et al. | |
| 2005/0076336 A1* | 4/2005 | Cutrell | H04L 47/70 |
| | | | 718/100 |
| 2005/0076339 A1* | 4/2005 | Merril | H04L 47/808 |
| | | | 718/104 |
| 2005/0138306 A1* | 6/2005 | Panchbudhe | G06F 11/2097 |
| | | | 714/E11.121 |
| 2005/0177603 A1 | 8/2005 | Shavit | |
| 2005/0193024 A1 | 9/2005 | Beyer et al. | |
| 2005/0203910 A1* | 9/2005 | Taguchi | G06F 16/182 |
| 2006/0015544 A1 | 1/2006 | Kodama | |
| 2006/0047999 A1 | 3/2006 | Passerini et al. | |
| 2006/0168154 A1* | 7/2006 | Zhang | H04L 67/1097 |
| | | | 707/E17.005 |
| 2007/0022087 A1 | 1/2007 | Bahar et al. | |
| 2007/0288533 A1* | 12/2007 | Srivastava | G06F 16/1844 |
| | | | 707/999.203 |
| 2008/0144079 A1 | 6/2008 | Pandey et al. | |
| 2008/0155386 A1* | 6/2008 | Jensen | H04L 67/1008 |
| | | | 709/224 |
| 2008/0182592 A1* | 7/2008 | Cha | H04W 12/08 |
| | | | 455/456.3 |
| 2008/0201454 A1* | 8/2008 | Soffer | H04L 41/0894 |
| | | | 709/220 |
| 2008/0256143 A1 | 10/2008 | Reddy et al. | |
| 2008/0275984 A1* | 11/2008 | Ullmann | H04L 43/0894 |
| | | | 709/224 |
| 2008/0294660 A1 | 11/2008 | Patterson et al. | |
| 2008/0294696 A1 | 11/2008 | Frandzel | |
| 2008/0301087 A1 | 12/2008 | Bernard | |
| 2009/0144422 A1 | 6/2009 | Chatley et al. | |
| 2009/0204636 A1 | 8/2009 | Li et al. | |
| 2009/0313312 A1 | 12/2009 | Colbeck et al. | |
| 2010/0005151 A1 | 1/2010 | Gokhale | |
| 2010/0082558 A1 | 4/2010 | Anglin et al. | |
| 2010/0161554 A1 | 6/2010 | Datuashvili et al. | |
| 2010/0257403 A1* | 10/2010 | Virk | G06F 11/1469 |
| | | | 707/E17.108 |
| 2010/0325476 A1 | 12/2010 | Zhang | |
| 2011/0040728 A1 | 2/2011 | Akirav et al. | |
| 2013/0254248 A1* | 9/2013 | Chang | G06F 16/182 |
| | | | 707/827 |
| 2014/0304240 A1* | 10/2014 | Zunger | G06F 11/3457 |
| | | | 707/692 |

FOREIGN PATENT DOCUMENTS

| | | |
|---|---|---|
| CN | 101080710 A | 11/2007 |
| JP | 2002132563 A | 5/2002 |
| JP | 2004289843 A | 10/2004 |
| JP | 2005504455 A | 2/2005 |
| JP | 2006185041 A | 7/2006 |
| JP | 2007199920 A | 8/2007 |
| JP | 2008158661 A | 7/2008 |
| WO | 02087136 A2 | 10/2002 |
| WO | 2007067480 A1 | 6/2007 |
| WO | 2008005212 A2 | 1/2008 |
| WO | 2008115770 A1 | 9/2008 |

OTHER PUBLICATIONS

Google Inc., Final Decision for Rejection, JP 2011-542576, Nov. 26, 2013, 2 pgs.
Google Inc., Notification on the Grant of Patent Right for Invention, CN 200980156970.8, Apr. 14, 2014, 1 pg.
Google Inc., Notice of Grounds of Rejection, JP 2014-061617, Dec. 9, 2014, 5 pgs.

(56) References Cited

OTHER PUBLICATIONS

Austin, Grid Enabling Data De-Duplication, 2nd IEEE International Conference on e-Science and Grid Computing, e-Science, 2006, 6 pgs.
Geer, Reducing the Storage Burden via Data Deduplication, IEEE Computer Society, vol. 41, No. 12, Dec. 2008, pp. 15-17.
Google Inc., International Search Report and Written Opinion, PCT/US2009/069234, Mar. 24, 2010, 9 pgs.
Google Inc., Notification of the First Office Action, CN 200980156970.8, Nov. 21, 2012, 6 pgs.
Google Inc., Office Action CA 2747746, Aug. 23, 2013, 2 pgs.
Google Inc., Patent Examination Report No. 1, AU 2009330073, Jul. 12, 2012 2 pgs.
Guy, Implementation of the Dicus Replicated File System, Proc. Summer USENIX Conference, Jun. 30, 1990, pp. 63-71.
Marks, Analysis: Using Data-De-duplication to cut storage requirements, Apr. 6, 2007, 4 pgs.
Nath, Evaluating the Usefulness of Content Addressable Storage for High-Performance Data Intensive Application, HPDC'08, Boston, MA Jun. 23-27, 2008, 10 pgs.
Wang, The Research of Web page De-duplication Based on Web Pages Reshipment Statement, 2009 1st Int'l Workshop on Database Technology and Applications, IEEE Computer Society, Apr. 25, 2009, pp. 271-274.
Wiesmann, Database Replication Techniques: a Three Parameter Classification, Proc. 19th IEEE Symposium, Nurnberg, Germany, Oct. 16, 2000, pp. 206-215.
Google Inc., CN App. No. 201410306908.5, Notification for Patent Registration Formalities, Jun. 30, 2017, 6 pgs.
Google Inc., International Search Report and Written Opinion, PCT/US2009/069234, Mar. 24, 2010, 14 pgs.
Google Inc., Notice of Grounds of Rejection, JP 2014-061617, Sep. 8, 2015, 2pgs.
Google, Communication pursuant to Article 94(3) EPC, EP Application 09799831.4, Jul. 18, 2016, 6pgs.
Mandagere, Implementation of the Ficus Replicated File Syste, Proc. of the Summer Usenix Conference, Jun. 30, 1990, pp. 63-71.
Google Inc., International Preliminary Report on Patentability, PCT/US2009/069234, Jun. 29, 2011, 6pgs.
Nath, P. et al.: "Evaluating the Usefulness of Content Addressable Storage for High-Performance Data Intensive Applications", HPDC'08, Jun. 23-27, 2008, Boston, MA, 10 pages.
Marks, H.: "Analysis: Using Data De-duplication to cut storage requirements", http://www.scaleoutadvantage.techweb.com/news/str.sub.--nwc20070406.sub.-- -analysis.jhtml, 4 pages.
Austin, J. et al.: "Grid Enabling Data De-Duplication", Second IEEE International Conference on e-Science and Grid Computing, e-Science 2006, 6 pages.
Notification of Transmittal of the International Search Report and the Written Opinion of the International Searching Authority, or the Declaration, corresponding to PCT/US2009/069234, mailed Mar. 25, 2010, 14 pages.
Richard G. Guy et al., "Implementation of the Ficus Replicated File System", Proceedings of the Summer USENIX Conference, Jun. 30, 1990, pp. 63-71, XP002234187.
David Geer, "Reducing the Storage Burden via Data Deduplication", IEEE Computer Society, vol. 41, No. 12, Dec. 2008, pp. 15-17, XP011249422.
Min-Yan Wang et al.,"The Research of Web Page De-duplication Based on Web Pages Reshipment Statement", 2009 First International Workshop on Database Technology and Applications, IEEE Computer Society, Apr. 25, 2009, pp. 271-274, XP031515216.
Matthias Wiesmann et al., "Database Replication Techniques: a Three Parameter Classification", Proceedings the 19.sup.th IEEE Symposium on Nurnberg, Oct. 16, 2000, pp. 206-215, XP010523961.
Pre Examination Report for Brazilian Patent Application No. PI0922990-6 dated Jul. 8, 2019.
Office Action for Brazilian Patent Application No. PI0922990-6 dated Jan. 21, 2020.
Office Action for Brazilian Patent Application No. PI0922990-6 dated May 12, 2020. 3 pages.
Random House Webster's College Dictionary, 1485 (2nd Random House ed. 1999).

\* cited by examiner

| Content Handle | ... | De-duplication designation record |
|---|---|---|
| Handle11 | ... | XX:Location01:Data,<br>YY:Location01:Data |
| Handle21 | ... | XX:Location02:Data,<br>YY:Location02:DeleteRequest |
| Handle31 | ... | YY:Location03:Data,<br>YY:Location03:DeleteRequest,<br>ZZ:Location01:Data,<br>ZZ:Location01:DeleteRequest |
| Handle41 | ... | YY:Location04:Data,<br>YY:Location04:DeleteRequest,<br>ZZ:Location02:Deduped |

FIG. 11

ASYNCHRONOUS DISTRIBUTED DE-DUPLICATION FOR REPLICATED CONTENT ADDRESSABLE STORAGE CLUSTERS

RELATED APPLICATIONS

This application is a continuation of U.S. patent Application Ser. No. 16/390,613, filed on Apr. 22, 2019, which is a continuation of U.S. patent Application Ser. No. 14/995,171, filed on Jan. 13, 2016 (now U.S. Pat. No. 10,291,699), which is a continuation of U.S. patent application Ser. No. 14/265,298, filed Apr. 29, 2014, which is a continuation of U.S. patent application Ser. No. 12/644,693, filed on Dec. 22, 2009 (now U.S. Pat. No. 8,712,974), which claims priority under 35 U.S.C. § 119 based on U.S. Provisional Patent Application No. 61/139,857, filed Dec. 22, 2008, the disclosures of which are all incorporated by reference herein in their entirety.

BACKGROUND

The enterprise computing landscape has undergone a fundamental shift in storage architectures in that central-service architecture has given way to distributed storage clusters.

As businesses seek ways to increase storage efficiency, storage clusters built from commodity computers can deliver high performance, availability and scalability for new data-intensive applications at a fraction of the cost compared to monolithic disk arrays. To unlock the full potential of storage clusters, the data is replicated across multiple geographical locations, thereby increasing availability and reducing network distance from clients.

Data de-duplication can identify duplicate objects and reduce required storage space by removing duplicates. As a result, data de-duplication is becoming increasingly important for a storage industry and is being driven by the needs of large-scale systems that can contain many duplicates.

SUMMARY

According to one implementation, a method may be performed by a device of a group of devices in a distributed data replication system. The method may include storing an index of objects in the distributed data replication system, the index being replicated while the replicas of objects are stored locally by the plurality of devices in the distributed data replication system. The method may also include conducting a scan of at least a portion of the index and identifying a redundant replica of the at least one of the objects based on the scan of the index. The method may further include de-duplicating the redundant replica by writing a de-duplication record to a portion of the index.

According to another implementation, a device, of a group of devices in a distributed data replication system, may include means for storing an index of objects in the distributed data replication system; means for writing changes to the index to designate a status of a replica of one of the objects; means for replicating the changes to the index to the plurality of devices in the distributed data replication system; means for conducting a scan of at least a portion of the index; means for identifying a redundant replica of the one of the objects based on the scan of the index; and means for de-duplicating the redundant replica.

According to yet another implementation, a system may include a memory to store instructions, a data store of objects and an index of the objects in the data store; and a processor. The processor may execute instructions in the memory to identify a status of an object in the data store, the status relating to whether the object has a replica and whether a delete request is associated with the object, write a de-duplication designation record to the index based on the status of the object, replicate the index with the de-duplication designation record to one or more devices, and receive, from one of the one or more devices, other de-duplication designation records associated with the object, where the de-duplication designation record and the other de-duplication designation records provide a basis for deletion of one or more replicas of the object.

According to still another implementation, a method performed by one or more devices may include storing an index of objects in multiple devices within a distributed data replication system and replicating the index throughout the distributed data replication system while storing the objects locally, where each device is responsible for de-duplication of the objects within a particular subset of the index; conducting a scan of each of the subsets of the index to identify redundant replicas based on the scan; de-duplicating the redundant; and automatically copying an object from a device with a replica having an ongoing delete request to a device with a replica having been previously de-duplicated.

According to a further implementation, a computer-readable memory may include computer-executable instructions. The computer-readable memory may include one or more instructions to conduct a scan of a portion of a index of objects in a distributed data replication system; one or more instructions to identify a redundant replica of one of the objects based on the scan of the portion of the index; one or more instructions to de-duplicate the redundant replica.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 11 is a diagram illustrating a portion of an exemplary global index according to an implementation described herein.

DETAILED DESCRIPTION

The following detailed description refers to the accompanying drawings. The same reference numbers in different drawings may identify the same or similar elements. Also, the following detailed description does not limit the invention.

Systems and/or methods described herein may provide an asynchronous distributed de-duplication algorithm for replicated storage clusters that provides availability, liveness and consistency guarantees for immutable objects. Implementations described herein may use the underlying replication layer of a distributed multi-master data replication system to replicate a content addressable index (also referred to herein as a "global index") between different storage clusters. Each object of the global index may have a unique content handle (e.g., a hash value or digital signature). In implementations described herein, the removal process of redundant replicas may keep at least one replica alive.

Exemplary Network Configuration

Figure 1:
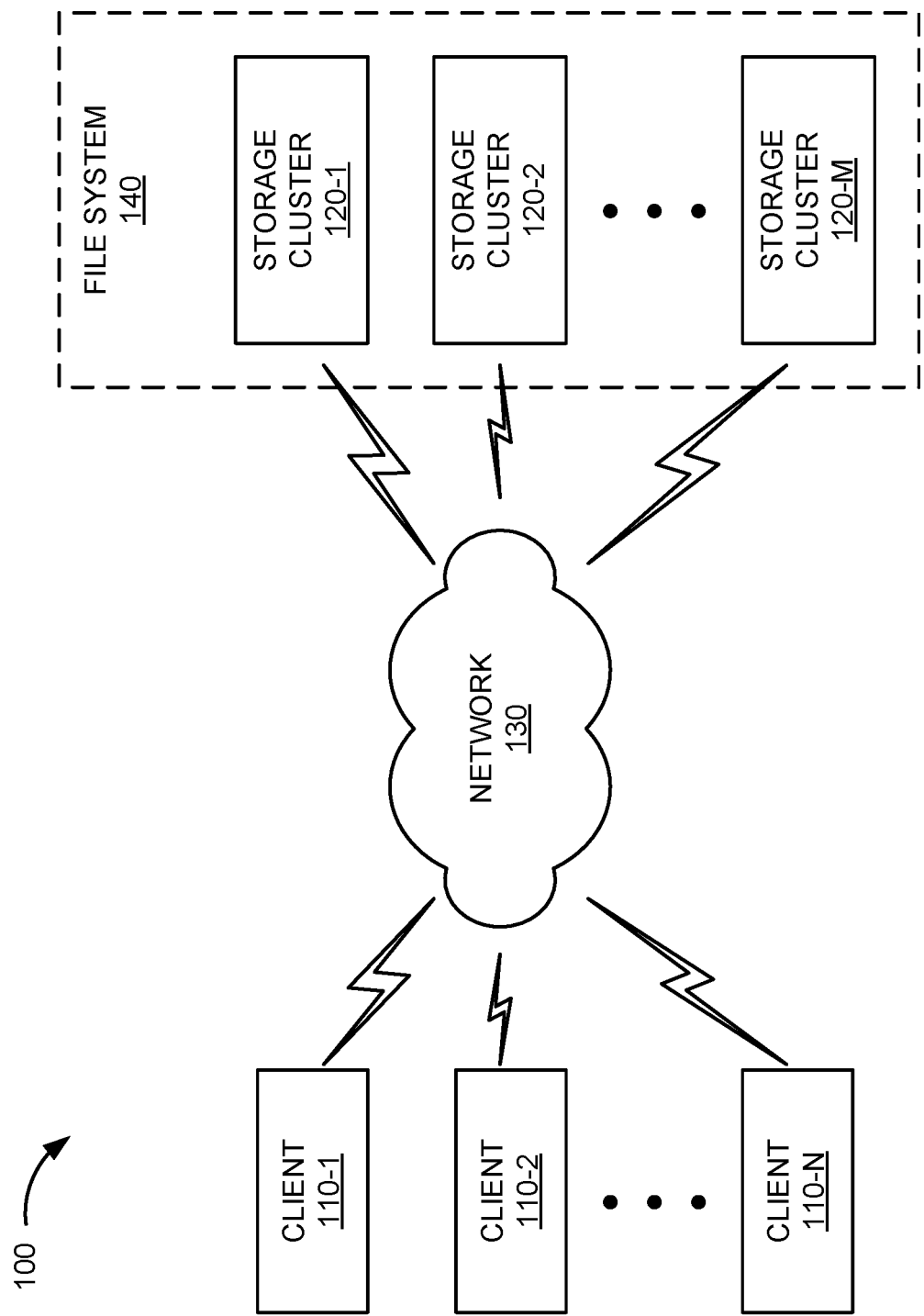
FIG. 1 is a diagram of an exemplary network in which systems and methods described herein may be implemented.

FIG. 1 is a diagram of an exemplary system 100 in which systems and methods described herein may be implemented. System 100 may include clients 110-1 through 110-N (referred to collectively as clients 110, and individually as client 110) and storage clusters 120-1 through 120-M (referred to collectively as storage clusters 120, and individually as storage cluster 120) connected via a network 130. Storage clusters 120 may form a file system 140 (as shown by the dotted line in FIG. 1).

Network 130 may include one or more networks, such as a local area network (LAN), a wide area network (WAN), a telephone network (e.g., the Public Switched Telephone Network (PSTN)), an intranet, the Internet, a similar or dissimilar network, or a combination of networks. Clients 110 and storage clusters 120 may connect to network 130 via wired and/or wireless connections.

Clients 110 may include one or more types of devices, such as a personal computer, a wireless telephone, a personal digital assistant (PDA), a lap top, or another type of communication device, and/or a thread or process running on one of these devices. In one implementation, a client 110 includes, or is linked to, an application on whose behalf client 110 communicates with storage cluster 120 to read or modify (e.g., write) file data.

Storage cluster 120 may include one or more server devices, or other types of computation or communication devices, that may store, process, search, and/or provide information in a manner described herein. In one implementation, storage cluster 120 may include one or more servers (e.g., computer systems and/or applications) capable of maintaining a large-scale, random read/write-access data store for files. The data store of storage cluster 120 may permit an indexing system to quickly update portions of an index if a change occurs. The data store of storage cluster 120 may include one or more tables (e.g., a document table that may include one row per uniform resource locator (URL), auxiliary tables keyed by values other than URLs, etc.). In one example, storage cluster 120 may be included in a distributed storage system (e.g., a "Bigtable" as set forth in Chang et al., "Bigtable: A Distributed Storage System for Structured Data," *Proc. of the 7th OSDI*, pp. 205-218 (November 2006)) for managing structured data (e.g., a random-access storage cluster of documents) that may be designed to scale to a very large size (e.g., petabytes of data across thousands of servers).

Although not shown in FIG. 1, system 100 may include a variety of other components, such as one or more dedicated consumer servers or hubs. A consumer server, for example, may store a read-only copy of a data store from one or more storage clusters 120 for access by clients 110. A hub, for example, may store a read-only copy of a data store from one or more storage clusters 120 for distribution to one or more consumer servers.

Exemplary Storage Cluster Configuration

Figure 2:
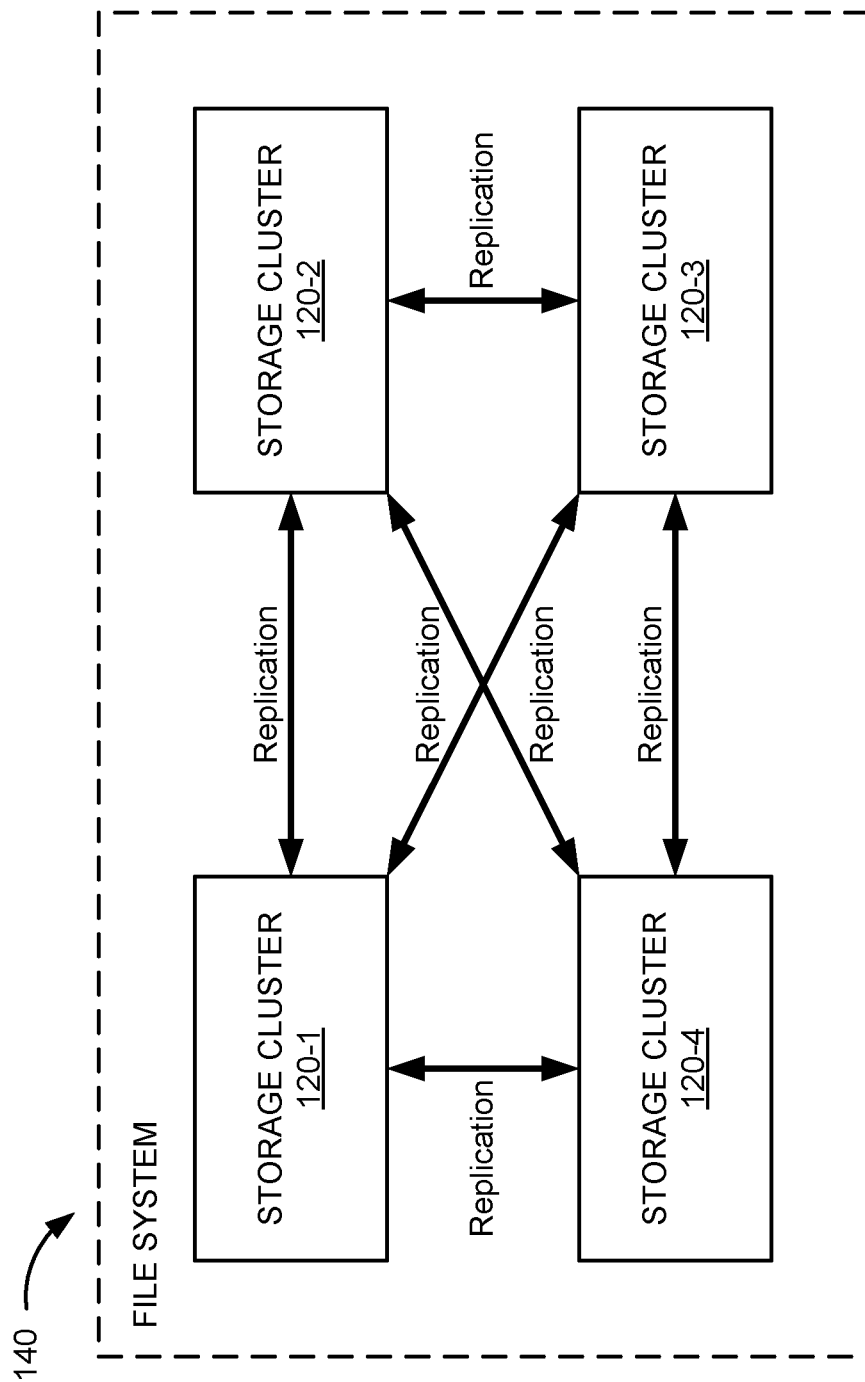
FIG. 2 is a diagram of an exemplary configuration of the file system of FIG. 1.

FIG. 2 is a diagram of an exemplary configuration of the file system 140. As shown in FIG. 2, file system 140 may include storage clusters 120-1, 120-2, 120-3, and 120-4. In one implementation, file system 140 may be a distributed multi-master data replication system, where each of storage clusters 120-1, 120-2, 120-3, and 120-4 may act as a master server for the other storage clusters. In file system 140, data may be replicated across storage clusters 120-1, 120-2, 120-3, and 120-4 (e.g., in multiple geographical locations) to increase data availability and reduce network distance from clients (e.g., clients 110). Generally, distributed objects and references may be dynamically created, mutated, cloned and deleted in different storage clusters 120 and an underlying data replication layer (not shown) maintains the write-order fidelity to ensure that all storage clusters 120 will end up with the same version of data. Thus, the data replication layer respects the order of writes to the same replica for a single object.

A global index of all of the objects in the distributed multi-master data replication system may be associated with each storage cluster 120. Each stored object may be listed by a unique content handle (such as a hash value, digital signature, etc.) in the global index. Selected storage clusters may each be assigned to be responsible for a distinct range of the content handles in the global index. For example, a single storage cluster 120 may be responsible for de-duplication of objects associated with particular content handles. Changes to the global index made by one storage cluster may be replicated to other storage clusters.

Although FIG. 2 shows exemplary functional components of file system 140, in other implementations, file system 140 may contain fewer, additional, different, or differently arranged components than depicted in FIG. 2. In still other implementations, one or more components of file system 140 may perform one or more tasks described as being performed by one or more other components of file system 140.

Figure 3:
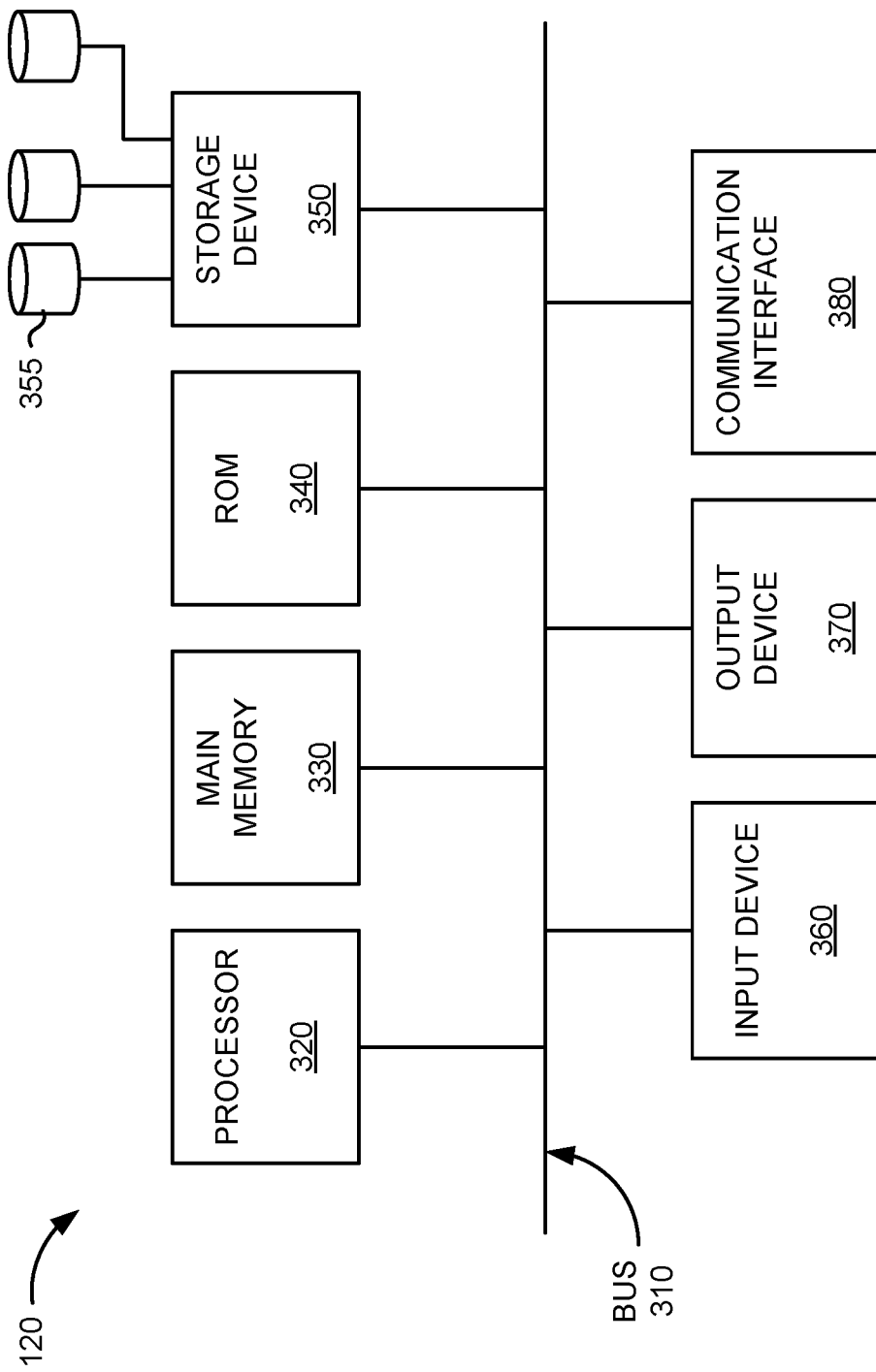
FIG. 3 is a diagram of exemplary components of a storage cluster of FIG. 1.

FIG. 3 is a diagram of exemplary components of storage cluster 120. Storage cluster 120 may include a bus 310, a processor 320, a main memory 330, a read-only memory (ROM) 340, a storage device 350, an input device 360, an output device 370, and a communication interface 380. Bus 310 may include one or more conductors that permit communication among the components of storage cluster 120.

Processor 320 may include any type of processor or microprocessor that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive. For example, storage device 350 may include one or more local disks 355 that provide persistent storage. In one implementation, storage cluster 120 may maintain metadata, for objects stored in file system 140, within one or more computer-readable mediums, such as main memory 330 and/or storage device 350. For example, storage cluster 120 may store a global index within storage device 350 for all the objects stored within a distributed multi-master data replication system.

Input device 360 may include one or more mechanisms that permit an operator to input information to storage cluster 120, such as a keyboard, a keypad, a button, a mouse, a pen, etc. Output device 370 may include one or more mechanisms that output information to the operator, including a display, a light emitting diode (LED), etc. Communication interface 380 may include any transceiver-like mechanism that enables storage cluster 120 to communicate with other devices and/or systems. For example, communication interface 380 may include mechanisms for communicating with other storage clusters 120 and/or clients 110.

Figure 4:
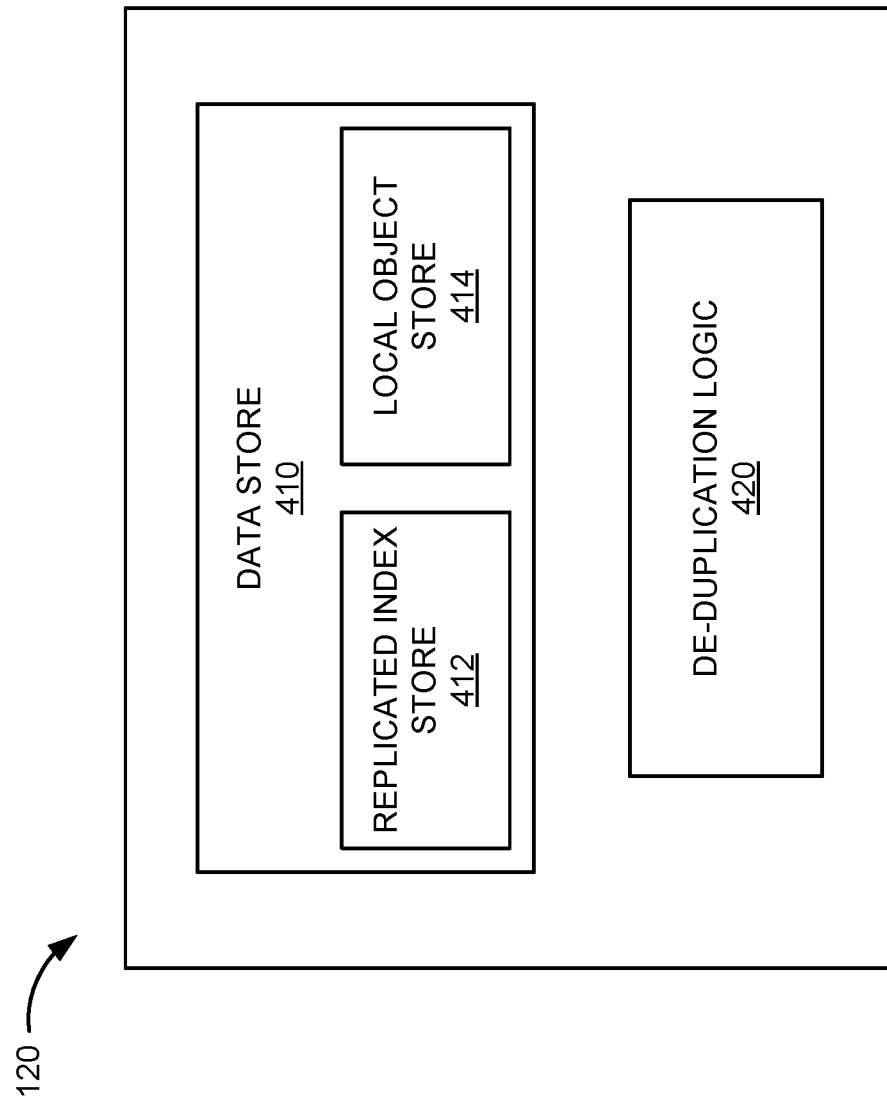
FIG. 4 is a functional block diagram of an exemplary storage cluster of FIG. 1.

FIG. 4 illustrates a functional block diagram of storage cluster 120. As shown in FIG. 4, storage cluster 120 may include data store 410 and de-duplication logic 420. In one implementation, as illustrated in FIG. 4, data store 410 may be provided within storage cluster 120. In other implementations, some or all of data store 410 may be stored within one or more other devices of system 100 in communication with storage cluster 120, such as external memory devices or devices associated with an indexing system (not shown).

Data store 410 may include a replicated index store 412 and a local object store 414. Replicated index store 412 may be included as part of the replication layer of the distributed multi-master data replication system. Replicated index store 412 may store information associated with the global index. At least a portion of replicated index store 412 may be replicated on multiple storage clusters 120. The number of replicas for each replicated index store 412 may be user-configurable. Local object store 414 may store objects locally within storage cluster 120. Local object store 414 may include files, such as images or videos uploaded by clients (e.g., clients 110).

De-duplication logic 420 may include logic to remove redundant replicas from storage clusters within the distributed multi-master data replication system (e.g., storage clusters 120-1, 120-2, 120-3, and 120-4). De-duplication logic 420 for each participating storage cluster may be assigned to be responsible for a particular section of the global index. For example, de-duplication logic 420 may be assigned to a particular range of content handles for the global index. Thus, only one storage cluster within the distributed multi-master data replication system may be able to perform destructive operations (e.g., deletion of replicas) on a replicated object within the system.

To facilitate de-duplication, records may be generated by de-duplication logic 420 and appended to a portion of the global index associated with a particular content handle. Records may include, for example, a "Data" designator for initiating a live replica, a "DeleteRequest" designator for indicating an ongoing delete request for a replica, and a "Deduped" designator for indicating a replica that has been selected for de-duplication. Record formats and uses are described in more detail below.

Although FIG. 4 shows exemplary functional components of storage cluster 120, in other implementations, storage cluster 120 may contain fewer, additional, different, or differently arranged functional components than depicted in FIG. 4. In still other implementations, one or more functional components of storage cluster 120 may perform one or more other tasks described as being performed by one or more other functional components.

Exemplary Record Structure

Figure 5:
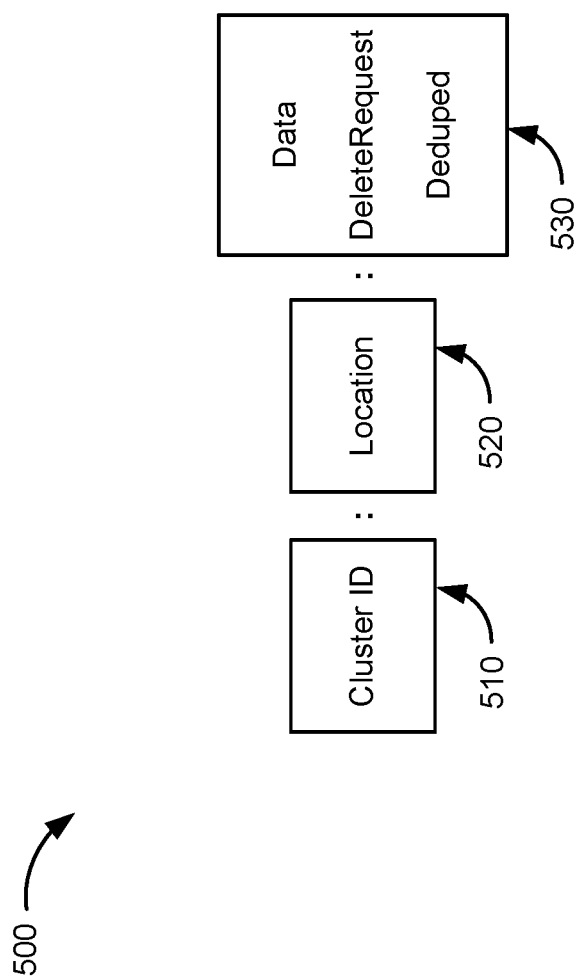
FIG. 5 is a diagram of an exemplary record structure that may be used within an index of a distributed multi-master data replication system.

FIG. 5 provides an illustration of an exemplary record structure 500 for a de-duplication designation record that may be written to the global index in an exemplary implementation. The de-duplication designation record may be associated in the global index with a particular content handle of an object replica. As shown in FIG. 5, record structure 500 may include storage cluster identifier ("ID") section 510, a storage location section 520, and designation section 530. Storage cluster identification section 510 may include a unique identification (e.g., "Cluster ID") for the storage cluster 120 that is storing the object replica for which the record is being written. Location section 520 may include an address for the location of the replica within storage cluster 120 that is identified by storage cluster identification section 510. Designation section 530 may include, for example, a "Data" designator, a "DeleteRequest" designator, or a "Deduped" designator.

Record structure 500 may be listed in the form of "ClusterID: Location: Designation." For example, a record for a replica may be added to the global index by storage cluster 120-1 with the record "01:234523/2000: DeleteRequest," where "01" is the cluster ID for storage cluster 120-1, "234523/2000" is the location, within storage cluster 120-1 at which the replica is stored, and "DeleteRequest" is the designator. A record for another replica of the same object in storage cluster 120-2 may be "02:234544/1000: Data," where "02" is the cluster ID for storage cluster 120-2, "234544/1000" is the location within storage cluster 120-2, and "Data" is the designator.

Exemplary Process Flows

Figure 6:
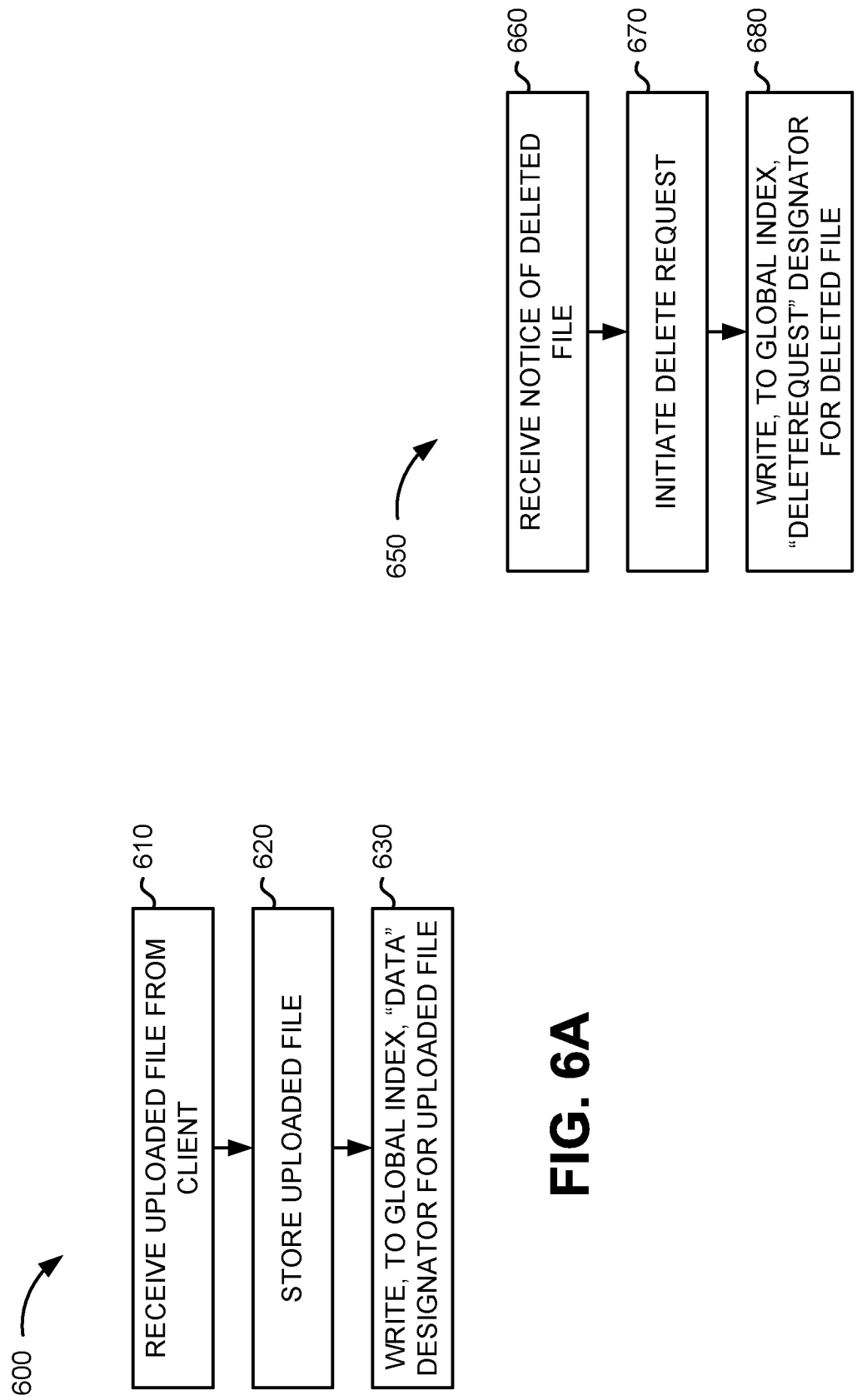
FIGS. 6A-6B are flowcharts of exemplary processes for managing client-initiated upload/delete operations.

FIGS. 6A and 6B are flowcharts of exemplary processes for managing client-initiated upload/delete operations. FIG. 6A depicts a flowchart for an exemplary process 600 of uploading an object from a client. FIG. 6B depicts a flowchart for an exemplary process 650 of removing an object deleted by a client. In one implementation, processes 600 and 650 may be performed by one of storage clusters 120. Processes 600 and 650 may be implemented in response to client (e.g., client 110) activities. For particular examples of processes 600 and 650 described below, reference may be made to storage cluster 120-1 of file system 140, where storage cluster 120-1 includes a cluster ID of "01."

Referring to FIG. 6A, process 600 may begin when an uploaded file is received from a client (block 610). For example, storage cluster 120-1 may receive a new file from one of clients 110. The uploaded file may be stored (block 620) and a "Data" designator for the uploaded file may be written to the global index (block 630). For example, storage cluster 120-1 may store the uploaded file in a memory (e.g., storage device 350) and add a content handle for the object to the global index. Storage cluster 120-1 may also write a data record (e.g., "01: Location: Data") to the replicated global index addressed by the content handle of the object.

Referring to FIG. 6B, process 650 may begin when a notice of a deleted file is received (block 660). For example, storage cluster 120-1 may receive an indication that one of clients 110 has deleted a file. A delete request may be initiated (block 670) and a "DeleteRequest" designator for the deleted file may be written to the global index (block 680). For example, storage cluster 120-1 may initiate a delete request to asynchronously remove the delete file from file system 140. Storage device 120-1 may also write a "DeleteRequest" record (e.g., "01: Location: DeleteReqeust") to the replicated global index addressed by the content handle of the object.

Figure 7:
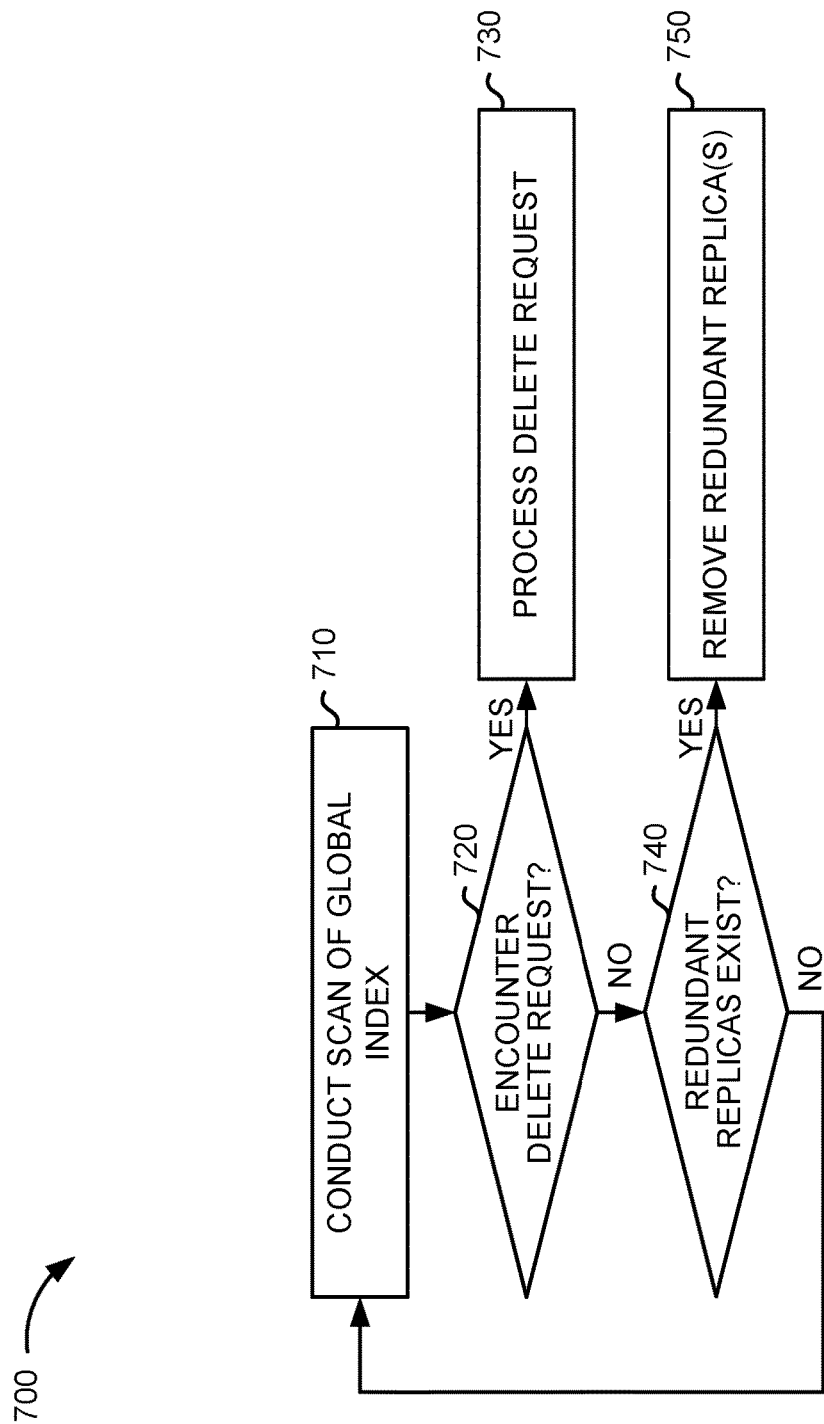
FIG. 7 is a flowchart of exemplary process for performing de-duplication in a distributed multi-master data replication system.

FIG. 7 is a flowchart of an exemplary process 700 for performing de-duplication in a distributed multi-master data replication system (e.g., file system 140). In one implementation, process 700 may be performed by one of storage clusters 120. In another implementation, some or all of process 700 may be performed by another device or a group of devices, including or excluding storage cluster 120. Process 700 may be implemented periodically in each storage cluster 120 and may include a scan of all or a portion of the objects in the storage cluster 120. For particular examples of process 700 described below, reference may be made to storage clusters 120-1 and 120-2 of file system 140, where storage cluster 120-1 includes a cluster ID of "01" and storage cluster 120-2 includes a cluster ID of "02."

As illustrated in FIG. 7, process 700 may begin with conducting a scan of the global index (block 710). For example, storage cluster 120-1 (using, e.g., de-duplication logic 420) may conduct a scan of all or a portion of the objects listed in the global index. The scan may identify, for example, multiple replicas and/or objects marked for deletion.

It may be determined if a delete request is encountered (block 720). For example, storage cluster 120-1 may encounter an object in the global index that includes a delete request designator (e.g., "02: Location: DeleteReqeust") from another storage cluster (e.g., from storage cluster 120-2). If it is determined that a delete request is encountered (block 720—YES), then the delete request may be processed (block 730). For example, storage cluster 120-1 may process the delete request as described in more detail with respect to FIG. 8.

If it is determined that a delete request is not encountered (block 720—NO), then it may be determined if redundant replicas exist (block 740). Redundant replicas may be replicated objects in different locations that have no outstanding delete requests for the object. For example, storage cluster 120-1 may identify multiple replicas for the same object that correspond to a content handle for which storage cluster 120-1 is responsible. The multiple replicas may be stored, for example, in different storage clusters (e.g., storage cluster 120-1 and storage cluster 120-2) or in different locations within the same storage cluster.

If it is determined that redundant replicas exist (block 740—YES), then the redundant replicas(s) may be removed (block 750). For example, storage cluster 120-1 may remove the redundant replica(s) as described in more detail with respect to FIG. 9. If it is determined that redundant replicas do not exist (block 740—NO), then the process may return to block 710, where another scan of the global index may be conducted (block 710).

Figure 8:
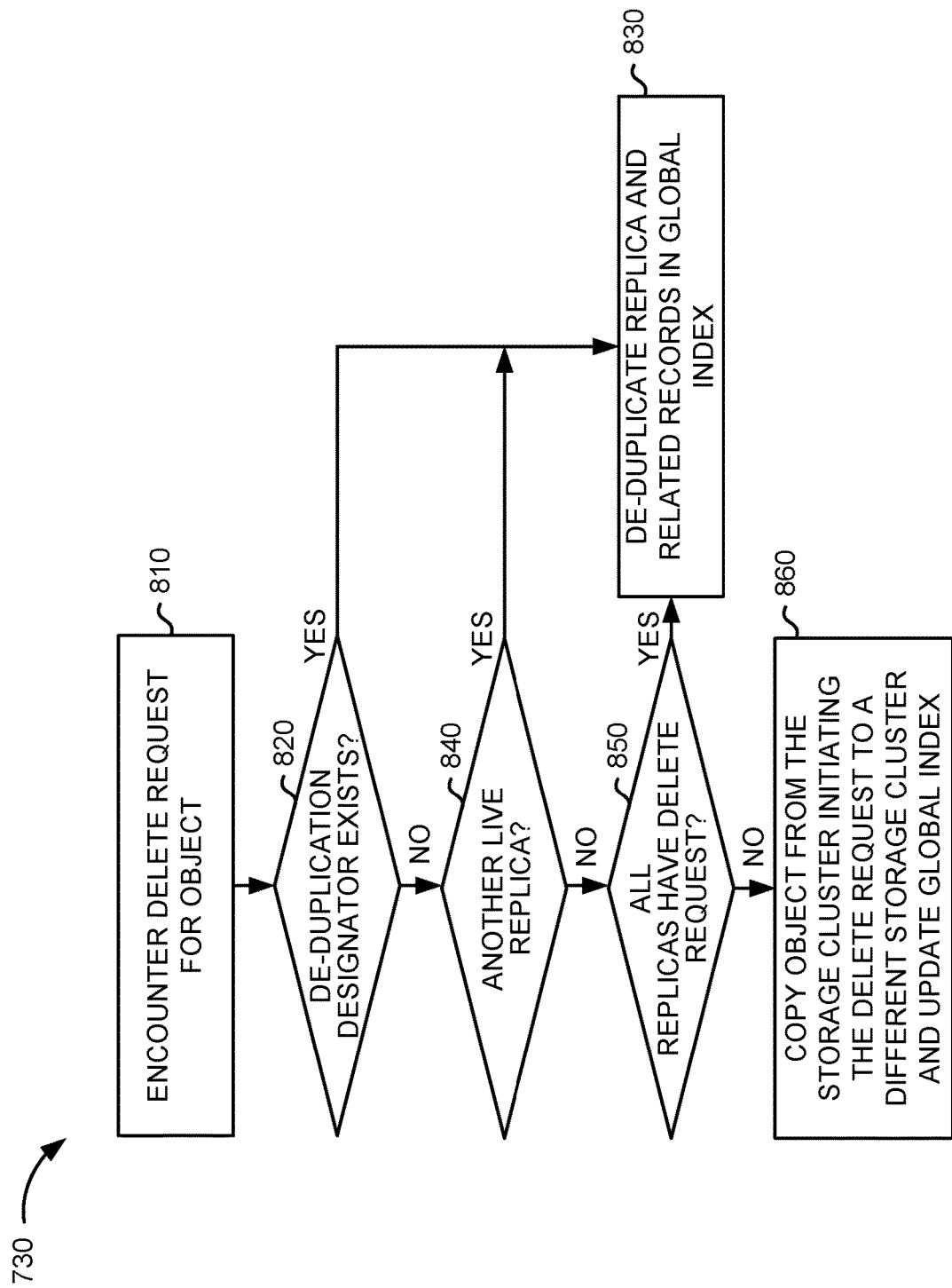
FIG. 8 is a flowchart of exemplary process for managing a delete request.

FIG. 8 illustrates exemplary operations associated with the processing of a delete request of block 730 of FIG. 7. A delete request may be encountered for an object (block 810). For example, a scan being conducted by storage cluster 120-1 may identify a content handle in the global index with a delete request designator previously written by storage cluster 120-1 to delete a replica in a certain storage cluster (e.g., "02: Location: DeleteRequest"). Assuming that storage cluster 120-1 is responsible for the content handle, storage cluster 120-1 may apply operations to determine if the replica can now be de-duplicated.

It may be determined if a de-duplication designator exists (block 820). For example, storage cluster 120-1 may review other records in the global index associated with the content handle to determine if a de-duplication designator exists (e.g., 02: Location: Deduped"). If it is determined that a de-duplication designator exists (block 820—YES), then the replica and the related records in the global index may be de-duplicated (block 830). For example, storage cluster 120-1 may initiate a delete request to delete the replica in storage cluster 120-2 (if any) and delete any records (e.g., "02: Location: *", where "*" may be any designator) from the global index that relate to the content handle for the deleted replica.

If it is determined that a de-duplication designator does not exists (block 820—NO), then it may be determined if another live replica exists (block 840). For example, storage cluster 120-1 may review the content handle for the global index to determine whether another live replica exists for the object. The global index may include, for example, a data record for that content handle from another storage cluster (e.g., "03: Location: Data").

If another live replica exists (block 840—YES), then the replica may be de-duplicated as described above with respect to block 830. If another live replica does not exist (block 840—NO), then it may be determined if all replicas have delete requests (block 850).

For example, storage cluster 120-1 may review the content handle for the global index to determine whether all the replicas associated with the content handle have an outstanding delete request (e.g., "*: *: DeleteRequest", where "*" may be any ClusterID and any location, respectively).

If it is determined that all replicas have delete requests (block 850—YES), then the replica may be de-duplicated as described above with respect to block 830. If it is determined that all replicas do not have delete requests (block 850—NO), then the object may be copied from a storage cluster that initiated a delete request to a different storage cluster and the global index may be updated (block 860). For example, in response to the record "02: Location: DeleteRequest," storage cluster 120-1 may copy the object from storage cluster 120-2 to another storage cluster 120-3 for which there is a de-duplication record (e.g., "03: Location: Deduped") and no outstanding delete request. Storage cluster 120-1 may delete the previous de-duplication record (e.g., "03: Location: Deduped") associated with the replica and write a data designator (e.g., "03: Location: Data") to the corresponding content handle of the object in the global index.

Figure 9:
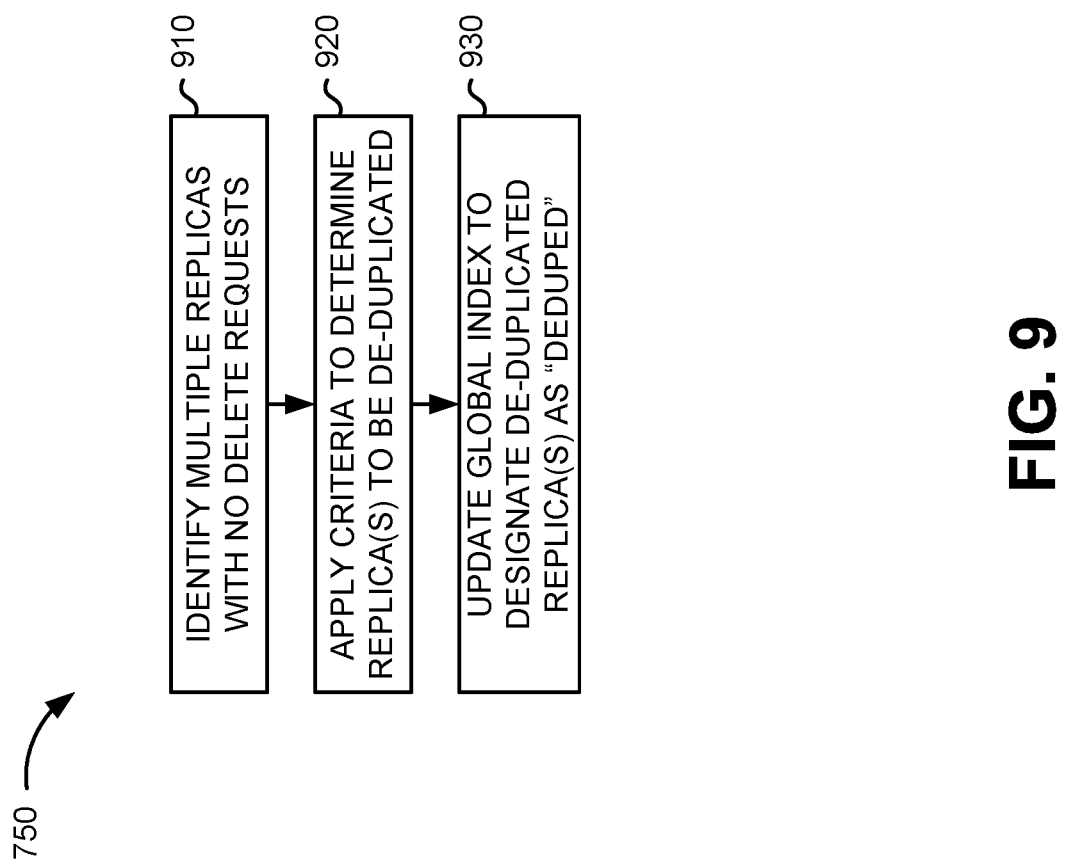
FIG. 9 is a flowchart of exemplary process for removing duplicate replicas.

FIG. 9 illustrates exemplary operations associated with the removing of duplicate references of block 750 of FIG. 7. Multiple replicas with no delete requests may be identified (block 910). For example, storage cluster 120-1 may review the global index and identify two or more replicas that have no outstanding delete requests corresponding to a content handle for which storage cluster 120-01 is responsible.

Criteria to determine replica(s) to be de-duplicated may be applied (block 920). For example, storage cluster 120-1 may apply criteria to de-duplicate the redundant replica that may be stored within storage cluster 120-1. The criteria to de-duplicate redundant replicas may be based on a variety of factors, such as geographic proximity of the replicas, available storage capacity at a storage cluster, or other factors. Storage cluster 120-1 (e.g., using de-duplication logic 420) may apply the criteria to the two or more replicas that have no outstanding delete requests identified above. In some implementations, multiple replicas may be identified to be de-duplicated. In other implementations, storage cluster 120-1 may leave more than one live replica (e.g., a replica not marked for de-duplication).

The global index may be updated to designate de-duplicated replica(s) as "Deduped" (block 930). For example, for each de-duplicated replica, storage cluster 120-1 may delete the previous data record (e.g., "02: Location: Data") associated with the replica and write a de-duplication designator (e.g., "02: Location: Deduped") to the corresponding content handle in the global index.

De-duplication of the redundant replicas may be accomplished using de-duplication messages that are replicated as a part of the global index. The replicas marked for de-duplication may be stored within storage cluster 120-1 or within another storage cluster (e.g., storage cluster 120-2, 120-3, 120-4, etc.). In one implementation, storage cluster 120-1 may delete locally-stored replicas and the corresponding "01: Location: Data" record from the global index and add "01: Location: Deduped" to the global index. Storage cluster 120-1 may also initiate delete messages, using the replicated global index, to delete replicas stored in other clusters.

Figure 10:
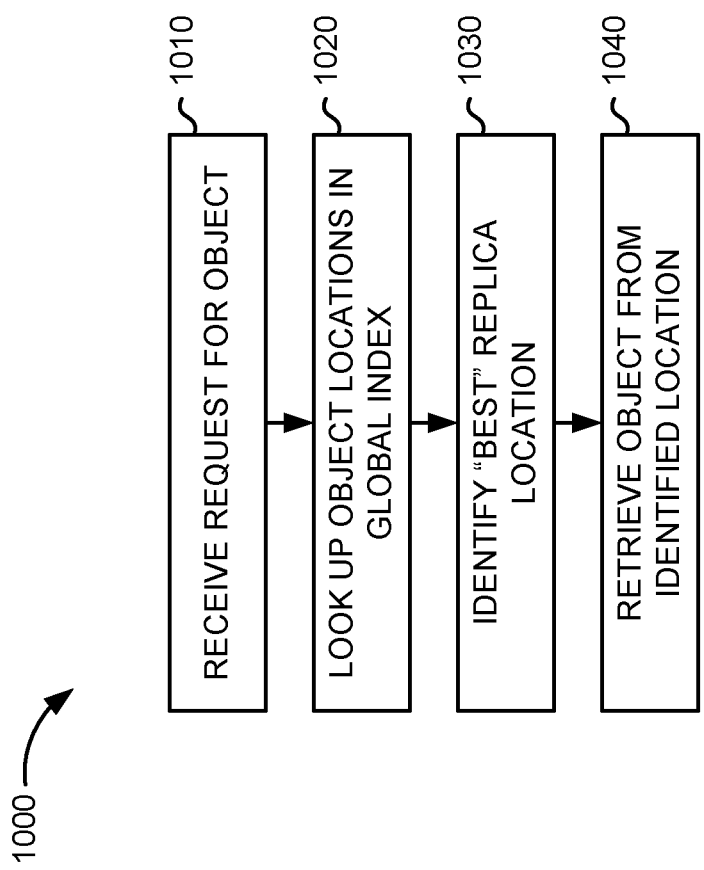
FIG. 10 is a flowchart of exemplary process for optimizing bandwidth consumption and reducing latency in a distributed multi-master data replication system.

FIG. 10 provides a flowchart of an exemplary process 1000 for optimizing bandwidth consumption and reducing latency in a distributed multi-master data replication system (e.g., file system 140). In one implementation, process 1000 may be performed by one of storage clusters 120. In another implementation, some or all of process 1000 may be performed by another device or group of devices, including or excluding storage cluster 120. For particular examples of process 1000 described below, reference may be made to storage cluster 120-1 of file system 140, where the storage cluster 120-1 includes a cluster ID of "01."

As illustrated in FIG. 1000, process 1000 may begin with receiving a request for an object (block 1010). For example, storage cluster 120-1 may receive a request from a client (e.g., client 110-1) to obtain an object.

Object locations may be looked up in the global index (block 1020). For example, storage cluster 120-1 may look up the replica location(s) for the object in the replicated global index using the content handle of the object.

The "best" replica location may be identified (block 1030). For example, assuming that more than one replica is available, storage cluster 120-1 may determine the "best" replica to retrieve to minimize network resources. For example, the "best" replica may be the replica that has the closest geographic location to storage cluster 120-1. In other implementations, the "best" replica may be based on a combination of available network connectivity, geographic location, and/or other criteria. Thus, in some implementations, the "best" replica for the object may be stored locally within storage cluster 120-1.

The object may be retrieved from the identified location (block 1040). For example, storage cluster 120-1 may request the "best" replica from the closest available storage cluster and receive the replica to satisfy the client request. Storage cluster 120-1 may then send the replica to the client.

EXAMPLES

FIG. 11 provides a portion 1100 of an exemplary global index according to an implementation described herein. The index may include, among other information, a content handle column 1110 and a De-duplication designation record column 1120. Assume, in exemplary index portion 1100, a distributed multi-master data replication system includes three storage clusters, XX, YY, and ZZ. A de-duplication algorithm may run periodically in each of storage clusters XX, YY, and ZZ and may scan all or a portion of the global index. Also, records (e.g., Data, DeleteRequest, and Deduped) may be written by one of storage clusters XX, YY, or ZZ to the global index associated with a particular object content handle. Modifications to the global index may be replicated to all other participating clusters (e.g., the remaining of storage clusters XX, YY, and ZZ).

As shown in FIG. 11, index portion 1100 includes content handles and associated delete designation records for four objects. "Handle11" has records indicating replicas are stored at storage cluster XX ("XX: Location01: Data") and storage cluster YY ("YY: Location01: Data"), respectively. "Handle21" has a record indicating a replica is stored at storage cluster XX ("XX: Location02: Data") and another replica at storage cluster YY has an ongoing delete request ("YY: Location: 02: DeleteRequest"). "Handle31" has records indicating replicas are stored at storage cluster YY ("XX: Location03: Data") and storage cluster ZZ ("ZZ: Location01: Data"), respectively. "Handle31" also has two records indicating the replicas have ongoing delete requests at storage cluster YY ("YY: Location03: DeleteRequest") and storage cluster ZZ ("ZZ: Location01: DeleteRequest"). "Handle41" has records indicating a replica is stored at storage cluster YY ("XX: Location04: Data") and a record indicating the replica with an ongoing delete request at storage cluster YY ("YY: Location04: DeleteRequest"). Handle41 also has one record indicating de-duplication of a replica has occurred ("ZZ: Location02: Deduped"). The de-duplication algorithm used by the storage clusters can operate using guidelines consistent with the principles described herein. Assume storage cluster XX is assigned responsibility for the portion of the global index including "Handle11," "Handle21," "Handle31," and "Handle41."

When an object is fully uploaded in a storage cluster, the storage cluster may write a data record (e.g., "ClusterID: Location: Data") to the replicated global index addressed by the content handle of the object. For example, "XX: Location01: Data" and "YY: Location01: Data" illustrate data records for replicas of "Handle11." Also, "XX: Location02: Data" illustrates a data record for a replica of "Handle21." Similar data records can be seen for "Handle31" and "Handle 41."

When an object is requested in a storage cluster, the storage cluster may look up the replica locations in the replicated global index using the content handle of the object and fetch the replica from the "best" (e.g., closest) cluster. For example, assuming an object corresponding to "Handle11" is requested at storage cluster ZZ and that storage cluster YY is closer to storage cluster ZZ than is storage cluster XX, storage cluster ZZ may request the object replica corresponding to "Handle11" from storage cluster YY.

When an object is deleted in a storage cluster, the storage cluster may write "ClusterID: Location: DeleteRequest" to the replicated global index addressed by the content handle of the object. For example, "YY: Location02: DeleteRequest" illustrates a record for a deleted replica of "Handle21" in storage cluster YY. Similarly, "YY: Location03: DeleteRequest" and "ZZ: Location: 01: DeleteRequest" illustrate records for deleted replicas of "Handle31" for storage clusters YY and ZZ, respectively.

If the scan in a storage cluster encounters multiple replicas that have no outstanding delete requests corresponding to a content handle the storage cluster is responsible for, the storage cluster may delete redundant replicas of the object (possibly leaving more than one live replica). For each deleted replica in another storage cluster, the storage cluster may delete the data record and write a de-duplication record. For example, the scan in storage cluster XX may identify that "Handle11" has records indicating replicas are stored at storage cluster XX ("XX: Location01: Data") and storage cluster YY ("YY: Location01: Data"), respectively. Based on criteria provided for removing redundant references, storage cluster XX may initiate deletion of the replica at storage cluster YY. Storage cluster XX may delete the record "YY: Location01: Data" shown in FIG. 11 and write "YY: Location01: Deduped" instead.

If the scan in storage cluster XX encounters a delete request (e.g., "ClusterID: Location: DeleteRequest") for a replica in another storage cluster (e.g., storage cluster YY or ZZ) corresponding to a content handle that storage cluster XX is responsible for, storage cluster XX may apply the following analysis. If there is a "Deduped" record for the same storage cluster and location as the delete request, if there exists another live replica of the object, or if all replicas have outstanding delete requests, the storage cluster XX can delete the replica of the object in storage cluster YY or ZZ (if any) and delete the records "YY: Location: *" or "ZZ: Location: *." For example, the replica for "Handle21" in storage cluster YY and the record "YY: Location02: DeleteRequest" may be deleted by storage cluster XX since another live object (indicated by the record "XX: Location02: Data") exists. Similarly, the replica for "Handle31" in storage cluster YY and the record "YY: Location: 03: DeleteRequest" may be deleted by storage cluster XX since both replicas in storage cluster YY and storage cluster ZZ have outstanding delete requests.

If storage cluster XX cannot delete the replica of the object in storage cluster YY or ZZ (e.g., there is not a "Deduped" record or another live replica of the object, and all replicas do not have outstanding delete requests), storage cluster XX can copy the object from YY or ZZ to another storage cluster for which there is a de-duplication record and no outstanding delete request, deleting the de-duplication record and writing a data record. For example, the replica for "Handle41" in storage cluster YY ("YY: Location04: DeleteRequest") may trigger storage cluster XX to copy the object associated with "Handle41" to storage cluster ZZ. Storage cluster XX may update the global index to change "ZZ: Location02: Deduped" to "ZZ: Location02: Data."

The correctness of the algorithm is straightforward as all deletion operations on the object are performed only by the scan process in the storage cluster responsible for its content handle. The algorithm also transparently deals with multiple object replicas in the same cluster that have different locations (e.g. XX: Location1 and XX: Location2).

CONCLUSION

Systems and/or methods described herein may store a global index of objects in a distributed data replication system and replicate the global index and some of the objects throughout the distributed data replication system. A storage cluster may be assigned as the responsible entity for de-duplication within a particular subset of the global index. The storage cluster may conduct a scan of the subset of the global index and identify redundant replicas based on the scan. The storage cluster may de-duplicate the redundant replicas stored locally or in a remote storage cluster.

The foregoing description of implementations provides illustration and description, but is not intended to be exhaustive or to limit the invention to the precise form disclosed. Modifications and variations are possible in light of the above teachings or may be acquired from practice of the invention.

For example, in another implementation a synchronous version of the de-duplication algorithm may be used in which different storage clusters communicate directly rather than using the replication layer within a distributed data replication system.

Also, while series of blocks have been described with regard to FIGS. 6A-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" or a "component" that performs one or more functions. This logic or component may include hardware, such as a processor, microprocessor, an application specific integrated circuit or a field programmable gate array, or a combination of hardware and software (e.g., software executed by a processor).

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The invention claimed is:

1. A computer-implemented method in a distributed data storage system comprising a plurality of storage clusters, the method comprising:
   receiving, by a first storage cluster, a request for an object;
   identifying, by the first storage cluster, locations of the object stored by a storage system by querying a global index stored in the first storage cluster, the locations including at least one first location and at least one replica location;
   determining, by the first storage cluster, which of the identified locations to use to read the object based on one or more criteria;
   retrieving the object from the determined location; and
   transmitting the retrieved object to a requesting client,
   wherein the global index is replicated in the plurality of storage clusters.

2. The method of claim 1, wherein the one of the one or more criteria is network resources.

3. The method of claim 2, wherein the network resources comprise bandwidth consumption.

4. The method of claim 2, wherein determining which of the locations to use to read the object minimizes the network resources.

5. The method of claim 1, wherein the one of the one or more criteria is geographic location of the first location and the least one replica location.

6. The method of claim 5, wherein determining which of the locations to use to read the object comprises selecting a closest geographic location of the stored object to a geographic location of a client requesting the object.

7. The method of claim 1, wherein the first location comprises a portion of the data store that is stored within a first storage cluster and the replica location comprises a second storage cluster different from the first storage cluster.

8. The method of claim 1, further comprising sending the retrieved object to a client that requested the object.

9. A system, comprising:
a plurality of storage clusters, each storage cluster comprising:
a plurality of object replicas;
a global index identifying storage locations of the object replicas across the plurality of storage clusters;
one or more memory; and
one or more processors in communication with the memory and configured to:
receive a request for an object;
identify locations of the object stored by a storage system by querying the global index stored in the storage cluster, the locations including at least one first location and at least one replica location;
determine which of the locations to use to read the object based on one or more criteria;
retrieve the object from the determined location; and
transmitting the retrieved object to a requesting client,
wherein the global index is replicated in the plurality of storage clusters.

10. The system of claim 9, wherein the one of the one or more criteria is based on network resources.

11. The system of claim 10, wherein the network resources comprise bandwidth consumption.

12. The system of claim 10, wherein determining which of the locations to use to read the object minimizes the network resources.

13. The system of claim 9, wherein the one of the one or more criteria is based on geographic location of the first location and the least one replica location.

14. The system of claim 13, wherein determining which of the locations to use to read the object comprises selecting a closest geographic location of the stored object to a geographic location of a client requesting the object.

15. The system of claim 9, wherein the first location comprises a portion of the data store that is stored within a first storage cluster and the replica location comprises a second storage cluster different from the first storage cluster.

16. The system of claim 9, wherein the one or more processors are further configured to send the retrieved object to a client that requested the object.

17. A non-transitory computer-readable medium storing instructed executable by one or more processors in a distributed data storage system comprising a plurality of storage clusters, cause the one or more processors to perform a method, comprising:
receiving, by a first storage cluster, a request for an object;
identifying, by the first storage cluster, locations of the object stored by a storage system by querying a global index stored in the first storage cluster, the locations including at least one first location and at least one replica location;
determining, by the first storage cluster, which of the identified locations to use to read the object based on one or more criteria; and
retrieving the object from the determined location; and
transmitting the retrieved object to a requesting client,
wherein the global index is replicated in the plurality of storage clusters.

18. The non-transitory computer-readable medium of claim 17, wherein the one or more criteria is based on network resources.

19. The non-transitory computer-readable medium of claim 18, wherein the network resources comprise bandwidth consumption.

20. The non-transitory computer-readable medium of claim 18, wherein determining which of the locations to use to read the object minimizes the network resources.

* * * * *